US009412052B1

(12) United States Patent
Natarajan et al.

(10) Patent No.: US 9,412,052 B1
(45) Date of Patent: Aug. 9, 2016

(54) METHODS AND SYSTEMS OF TEXT EXTRACTION FROM IMAGES

(71) Applicants: Harihara Vinayakaram Natarajan, Bangalore (IN); Tamilselvan Subramanian, Namakkal (IN)

(72) Inventors: Harihara Vinayakaram Natarajan, Bangalore (IN); Tamilselvan Subramanian, Namakkal (IN)

(73) Assignee: WIPRO LIMITED, Bangalore (IN)

( * ) Notice: Subject to any disclaimer, the term of this patent is extended or adjusted under 35 U.S.C. 154(b) by 0 days.

(21) Appl. No.: 14/748,023

(22) Filed: Jun. 23, 2015

(30) Foreign Application Priority Data

Mar. 16, 2015 (IN) .......................... 1303/CHE/2015

(51) Int. Cl.
*G06K 9/34* (2006.01)
*G06K 9/72* (2006.01)
*G06K 9/40* (2006.01)
*G10L 15/00* (2013.01)

(52) U.S. Cl.
CPC *G06K 9/72* (2013.01); *G06K 9/344* (2013.01); *G06K 9/40* (2013.01)

(58) Field of Classification Search
CPC ............ G06K 9/00; G06T 5/00; G01N 21/00
USPC .......... 382/108, 176, 229, 290, 292; 704/226, 704/251
See application file for complete search history.

(56) References Cited

U.S. PATENT DOCUMENTS 5,168,533 A * 12/1992 Kato ................ G06F 17/30011 382/229

* cited by examiner

*Primary Examiner* — Abolfazl Tabatabai
(74) *Attorney, Agent, or Firm* — Finnegan, Henderson Farabow, Garrett & Dunner LLP

(57) ABSTRACT

A method for extracting text from an image data is disclosed. The method includes pre-processing, via a processor, the image data to obtain a readable image data. The method further includes filtering, via the processor, a plurality of copies of the readable image data using a plurality of noise filters to obtain a corresponding plurality of noise removed images. Yet further, the method includes performing, via the processor, image data recognition on each of the plurality of noise removed images to obtain a text copy associated with each of the plurality of noise removed images. Moreover, the method includes ranking, via the processor, each word in the text copy associated with each of the plurality of noise removed images based on a predefined set of parameters. Finally, the method includes selecting, via the processor, highest ranked words within the text copy associated with each of the plurality of noise removed images to obtain output text for the image data.

22 Claims, 7 Drawing Sheets

500

502

Here Comes the Optimus Prime
While I function, Earth is under my protection!

504

518 520 522 524 526

506 508 510 512 514

| Line 1 | Word Index 1 | Word Index 2 | Word Index 3 | Word Index 4 | Word Index 5 |
|---|---|---|---|---|---|
| Image Index 1 | Tiere | Oomes | Thy | Optinus | Prime |
| Image Index 2 | llere | Comes | The | Optimus | Prlme |
| Image Index 3 | Here | Comes | Thi | Optimus | Pnime |
| Image Index 4 | Tieie | Comes | The | Ojolimus | Prime |
| Image Index 5 | Here | Comes | The | Optinus | Prime |

528

540 542 544 546 548 550 552 554

530 532 534 536 538

| Line 2 | Word Index 1 | Word Index 2 | Word Index 3 | Word Index 4 | Word Index 5 | Word Index 6 | Word Index 7 | Word Index 8 |
|---|---|---|---|---|---|---|---|---|
| Image Index 1 | While | L | lunolion | Barth | Is | Under | My | prolection |
| Image Index 2 | Uuhile | l | function | Earth | Is | onder | ny | protection |
| Image Index 3 | While | J | lonolian | Barlh | is | Under | My | protection |
| Image Index 4 | Hile | L | function | earth | is | Under | My | protection |
| Image Index 5 | Wnile | l | functiom | ealtn | is | under | my | prolection |

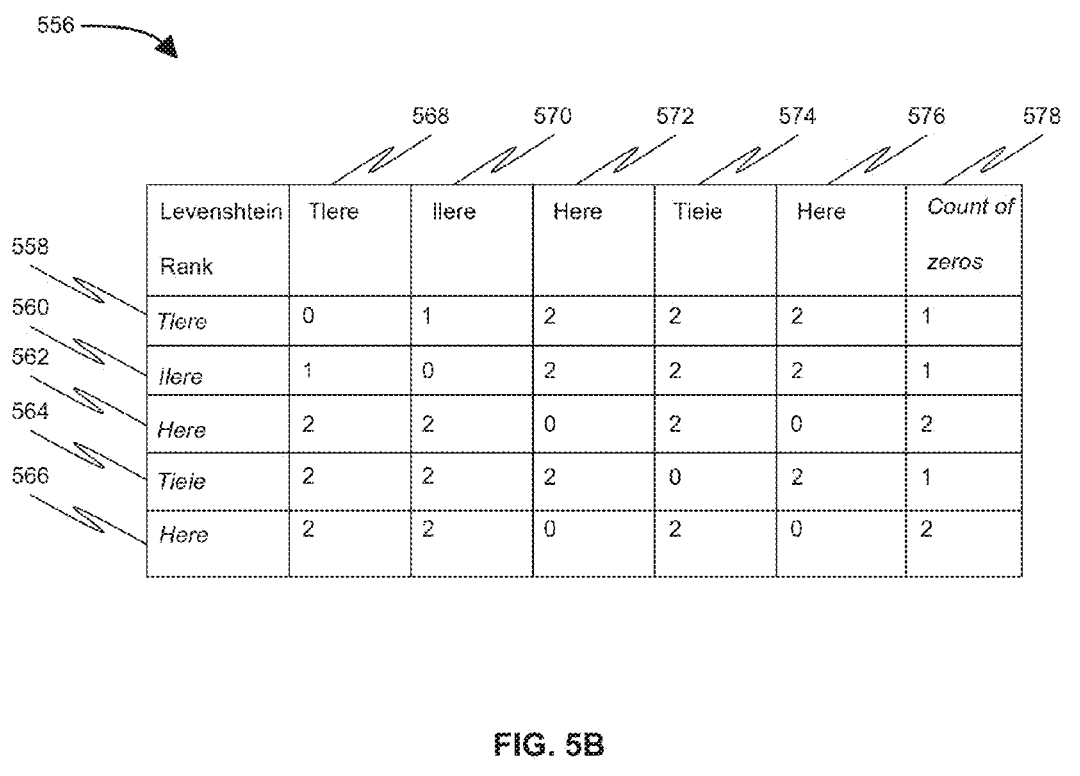

| Levenshtein Rank | Tlere | llere | Here | Tieie | Here | *Count of zeros* |
|---|---|---|---|---|---|---|
| *Tlere* | 0 | 1 | 2 | 2 | 2 | 1 |
| *llere* | 1 | 0 | 2 | 2 | 2 | 1 |
| *Here* | 2 | 2 | 0 | 2 | 0 | 2 |
| *Tieie* | 2 | 2 | 2 | 0 | 2 | 1 |
| *Here* | 2 | 2 | 0 | 2 | 0 | 2 |

FIG. 5B

METHODS AND SYSTEMS OF TEXT EXTRACTION FROM IMAGES

PRIORITY CLAIM

This U.S. patent application claims priority under 35 U.S.C. §119 to: India Application No. 1303/CHE/2015, filed on Mar. 16, 2015. The entire contents of the aforementioned application are incorporated herein by reference.

DESCRIPTION

1. Technical Field

This disclosure relates generally to text extraction, and more particularly to methods and systems for text extraction from images.

2. Background

Digital images are captured, for example, using cameras, digital video recorders or scanners, and include a variety of content, for example, textual content. The textual content in an image may include text of varying size, orientation, and typeface. When there is a need to extract textual content from the images, Optical Character Recognition (OCR) tools are used, which process images with printed text to obtain the textual content.

The conventional OCR tools are effective for extracting textual content from clear images, i.e., images without any noise. However, these conventional OCR tools are not effective in extracting textual content from an image with noise. For example, an image with handwritten characters (example, a hand drawn circle mark on a printed text), an image of a paper document with a smudge mark caused by a spill out, and a faded text on an image (example, a faded thermal print). Using these conventional OCR tools to extract textual content from images with noise results in erroneous text. For example, special characters may be returned in place of noisy text in an image. Moreover, the conventional OCR tools require special training with samples of noisy images, before they can be used for extraction of text.

SUMMARY

In one embodiment, a method for extracting text from an image data is disclosed. The method includes pre-processing, via a processor, the image data to obtain a readable image data. The method further includes filtering, via the processor, a plurality of copies of the readable image data using a plurality of noise filters to obtain a corresponding plurality of noise removed images. Yet further, the method includes performing, via the processor, image data recognition on each of the plurality of noise removed images to obtain a text copy associated with each of the plurality of noise removed images. Moreover, the method includes ranking, via the processor, each word in the text copy associated with each of the plurality of noise removed images based on a predefined set of parameters. Finally, the method includes selecting, via the processor, highest ranked words within the text copy associated with each of the plurality of noise removed images to obtain the output text for the image data.

In another embodiment, a system for extracting text from an image data is disclosed. The system includes a processor configured to pre-process the image data to obtain a readable image data. The processor is further configured to filter a plurality of copies of the readable image data using a plurality of noise filters to obtain a corresponding plurality of noise removed images. Yet further, the processor is configured to perform image data recognition on each noise removed image to obtain a text copy associated with each noise removed image. Moreover, the processor is configured to rank each word in the text copy associated with each noise removed image based on a predefined set of parameters. Finally, the processor is configured to select highest ranked words within the text copy associated with each noise removed image to obtain the output text for the image data.

In yet another embodiment, a non-transitory computer-readable storage medium for extracting text from an image data is disclosed, such that when executed by a computing device, the non-transitory computer-readable storage medium cause the computing device to pre-process the image data to obtain a readable image data; filter a plurality of copies of the readable image data using a plurality of noise filters to obtain a corresponding plurality of noise removed images; perform image data recognition on each noise removed image to obtain a text copy associated with each noise removed image; rank each word in the text copy associated with each noise removed image based on a predefined set of parameters; and select highest ranked words within the text copy associated with each noise removed image to obtain output text for the image data.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIGS. 5A and 5B illustrate the method of extraction of text from an image data, in accordance with an exemplary embodiment.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
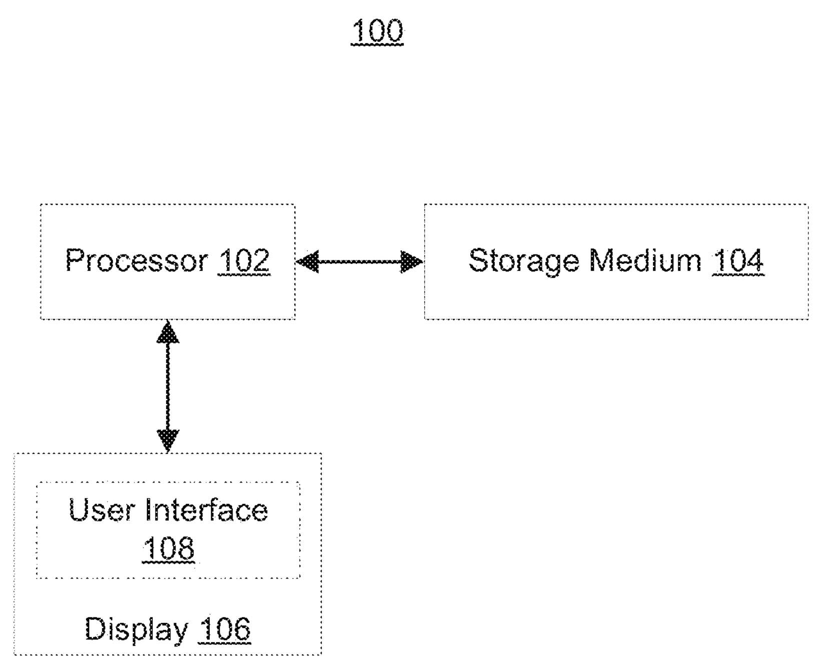
FIG. 1 is a block diagram of a system for extracting text from images, in accordance with an embodiment.

Referring now to FIG. 1, a system 100 for extracting text from images is illustrated, in accordance with an embodiment. In particular, system 100 is configured to extract text from images with noise, without requiring any special training. System 100 includes one or more processors (for example, a processor 102), a storage medium (e.g., a memory) 104, and a display 106. Storage medium 104 stores instructions that, when executed by the one or more processors, cause the one or more processors to extract text from images in accordance with various embodiments. In an embodiment, storage medium 104 may be a computer readable medium. System 100 interacts with users through a user interface 108 accessible to the users via display 106.

Figure 2:
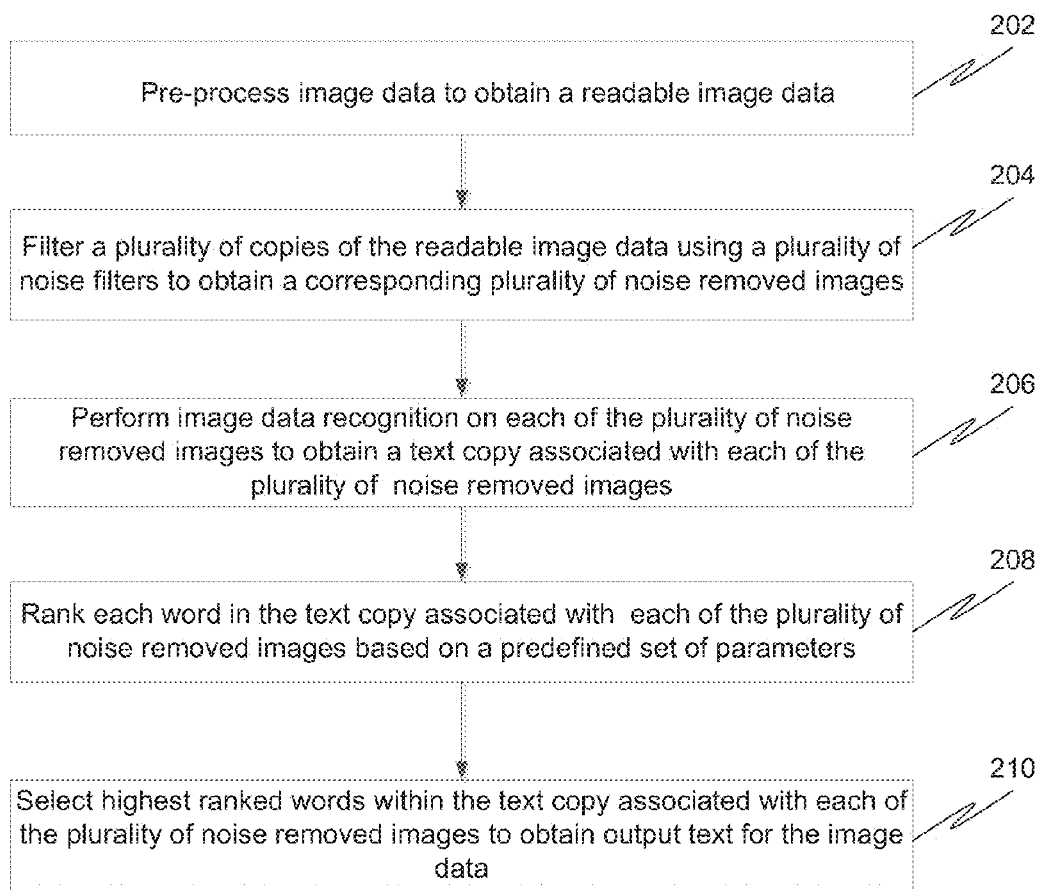
FIG. 2 illustrates a flowchart of a method for extracting text from an image data, in accordance with an embodiment.

FIG. 2 illustrates a flowchart of a method for extracting text from an image data, in accordance with an embodiment. An image data is received, which is an image that includes textual content along with noise. The noise, for example, may include but is not limited to handwritten characters on a printed text, smudge marks on a printed text caused by a spill out, and faded text characters. To extract text from such an image data, at 202, the image data is pre-processed to obtain a readable image data. The pre-processing may include one or more of tilting the image data, adjusting the corners of the image data, adjusting the brightness of the image data, inverting the image data, and adjusting gray scale of the image data. These have been described in detail in conjunction with FIG. 3 below. Thus, in other words, pre-processing results in a readable copy of the image data which can be further processed to enable extraction of text. To this end, a plurality of copies of the readable image data may be created.

Thereafter, at 204, the plurality of copies of the readable image data are filtered using a plurality of noise filters to obtain a corresponding plurality of noise removed images. The plurality of noise filters work in parallel, such that, a particular noise filter performs filtering action on one copy of the readable image data. By way of an example, five copies of a readable image are created. In this case, five different noise filters will be used to filter these five copies, such that, one noise filter is employed for one copy of the readable image. A particular noise filter will output one noise removed image, thus resulting in five noise removed images in all. In an alternate embodiment, one or more noise filters may be employed in series, such that they perform filtering action on a copy of the readable image data one after another. A noise filter, for example, may include but is not limited to an erode filter, a dilation filter, a bitwise Not filter, a contour filter, a decomposition filter, and a threshold filter.

Thereafter, at 206, image data recognition is performed on each of the plurality of noise removed images to obtain a text copy associated with each of the plurality of noise removed images. The image data recognition is performed in parallel on each of the plurality of noise removed images. In other words, one text copy is obtained for a particular noise removed image. In continuation of the example given above, when image data recognition is performed on the five noise removed images, five different text copies are obtained, such that, a particular text copy is obtained for a given noise removed image. In an embodiment, a text copy may be obtained in various formats, which may include but are not limited to a multi-dimensional text format that may be represented as: [Image index, Word index, Word]. The multi-dimensional text format is explained in further detail in conjunction with FIGS. 5A and 5B below. The image data recognition may be performed via Optical Character Recognition (OCR) tools. Examples of the OCR tools may include, but are not limited to Tesseract™, OpenCV™, Adobe Acrobat™, OmniPage™, ABBYY FineReader™, Readiris™, and Microsoft OneNote™.

In an embodiment, apart from the textual content, image data also includes faces and objects. In this embodiment, the image data recognition further includes performing face recognition and object recognition for the image data. Face recognition may be performed, using face recognition tools, which may include but are not limited to OpenBR™ and OpenCV™. Further, object recognition may be performed using object recognition tools, which may include but are not limited to TINA™ and OpenCV™.

After a text copy has been obtained, at 208, each word in the text copy associated with each of the plurality of noise removed images is ranked based on a predefined set of parameters. In continuation of the example given above, each word in the five text copies associated with the five noise removed images is ranked. The number of words is same in all the five text copies. The ranking is performed based on position of the word in the five text copies. For example, the process starts with ranking the first word in each of the five text copies. Then, the second word in each of the five text copies is ranked. This is repeated until all words in the five text copies are ranked.

The predefined set of parameters for a word may include a string distance of the word across text copies associated with each of the plurality of noise removed images. The string distance may be calculated using a distance algorithm, for example, the Levenshtein distance algorithm. The Levenshtein distance is a string metric for measuring the difference between two sequences. The Levenshtein distance between two words is the minimum number of single-character edits (i.e. insertions, deletions or substitutions) required to change one word into the other. The predefined set of parameters may further include a word index associated with the word. The word index is representative of a position of the word across the text copies. This is further explained in detail in conjunction in FIGS. 5A and 5B below.

Finally, at 210, the highest ranked words within the text copy associated with each of the plurality of noise removed images are selected to obtain the output text for the image data. Thereafter, all the selected words may be consolidated to produce the output text. In continuation of the example given above, the highest ranked words in the five text copies are selected to obtain output text. Firstly, the highest ranked first word, across all the five text copies, is selected as the first word for the output text. Similarly, the highest ranked second word, across all the five text copies, is selected as the second word for the output text. This is repeated until all words are selected for the output text. In an embodiment, this may be achieved by sorting the ranks per each word in an ascending order, and then, for each word, choosing the word on the top of the sorted list for the output text.

Figure 3:
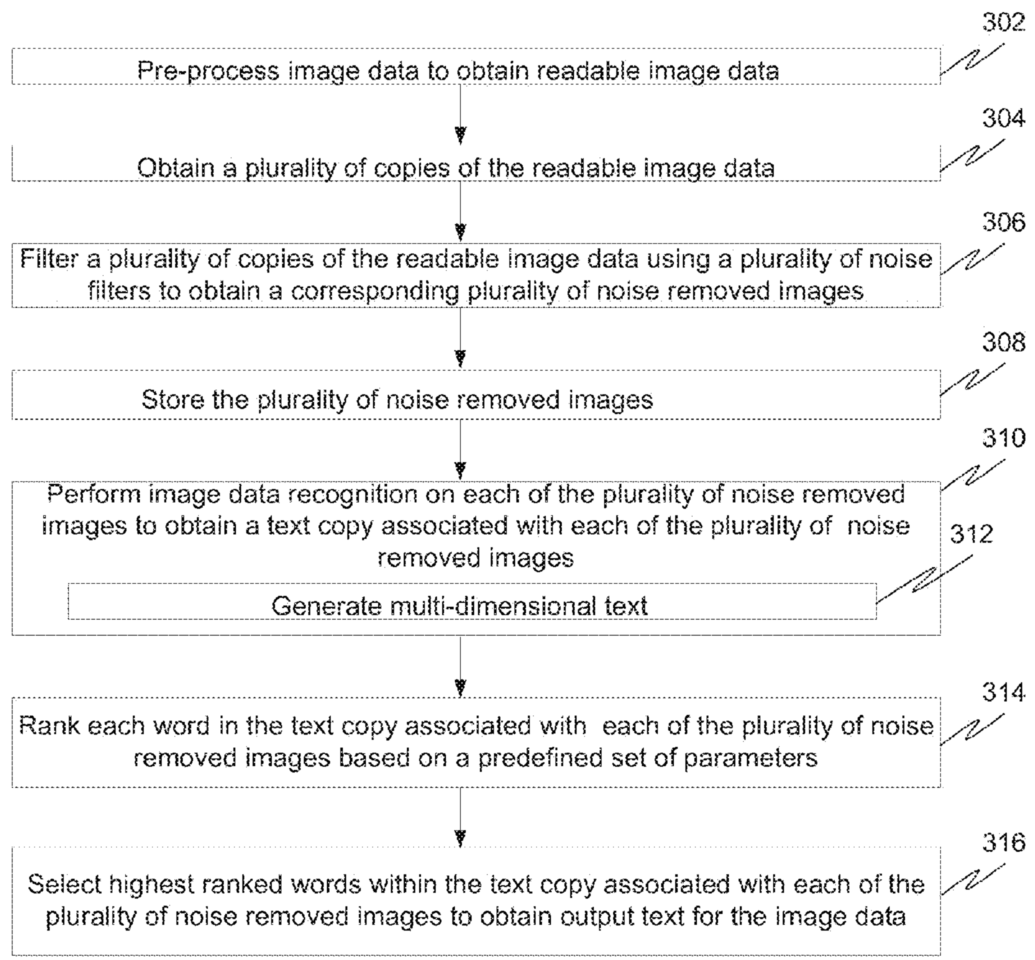
FIG. 3 illustrates a flowchart of a method for extracting text from an image data, in accordance with another embodiment.

Referring now to FIG. 3, a method for extracting text from an image data is illustrated, in accordance with another embodiment. An image data is received, which is an image that includes textual content along with some noise. The noise, for example, may include, but are not limited to handwritten characters on a printed text, smudge marks on a printed text caused by a spill out, and faded text characters. To extract text from such an image data, at 302, the image data is pre-processed to obtain a readable image data. The pre-processing includes tilting the image data. The image data may be tilted in steps of a predefined angle of rotation, until the text is readable. For example, the image data may be rotated by 30 degrees. If the text is not readable even after the rotation, then the image data is again rotated by 30 degrees. This is repeated until the text is readable. The angle of rotation may be varied as required.

When the corners of the image data are not aligned, the pre-processing may further include adjusting the corners. The corners may be adjusted by subjecting the image data to a plurality of movements, which may include but are not limited to left to right movement, right to left movement, top to bottom movement, and bottom to top movement. If the image data is a colored image, the pre-processing may further include inverting the image data from a colored image to a grayscale image to make it more readable. Further, if the background in the image data is dark, the pre-processing may further include adjusting the gray scale of the image data. The pre-processing may also include adjusting the brightness of the image data based on an optimum brightness threshold of the image data. Moreover, if the Dots Per Inch (DPI) of the image data does not match a default value, the pre-processing may include adjusting the DPI such that it matches the default value. For example, the default value for the DPI may be 300 DPI.

Thereafter, at 304, a plurality of copies of the readable image data is obtained. The number of copies of the readable image data obtained may be determined based on the number of noise filters available for use. Then, at 306, the plurality of copies of the readable image data are filtered using a plurality of noise filters to obtain a corresponding plurality of noise removed images. This has been explained in detail in conjunction with FIG. 2 above.

The plurality of noise removed images are then stored at 308, after which, at 310, image data recognition is performed on each of the plurality of noise removed images to obtain a text copy associated with each of the plurality of noise removed images. Performing image data recognition further includes generating a multi-dimensional text format, at 312, corresponding to the text copy obtained for each of the plurality of noise removed images. The multi-dimensional text format is further explained in detail in conjunction with FIGS. 5A and 5B below.

Thereafter, at 314, each word in the text copy associated with each of the plurality of noise removed images is ranked based on a predefined set of parameters. Further, the ranking includes using the distance algorithm to weigh each word by the word index, such that the highest fit words are ranked as highest numerical rank value. This has been explained in detail in conjunction with FIG. 2 above. Finally, at 316, the highest ranked words within the text copy associated with each of the plurality of noise removed images are selected to obtain the output text for the image data. This has been explained in detail in conjunction with FIG. 2 above.

Figure 4:
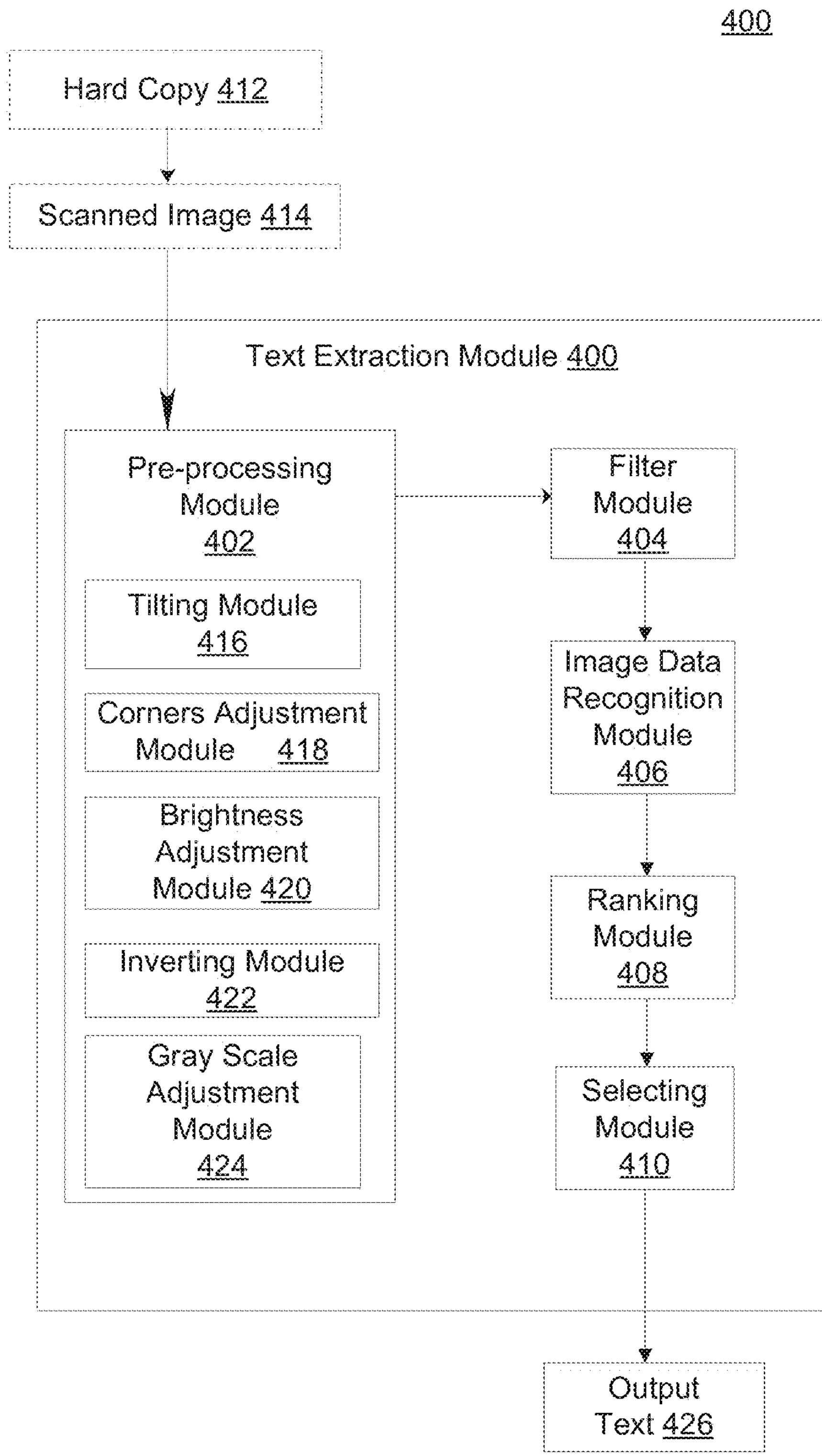
FIG. 4 is a functional block diagram of a text extraction module, in accordance with an embodiment.

FIG. 4 is a functional block diagram of a text extraction module 400 implemented by system 100 of FIG. 1, in accordance with an embodiment. Text extraction module 400 includes a pre-processing module 402, a filter module 404, an image data recognition module 406, a ranking module 408, and a selecting module 410. The various modules work together to extract high quality text from an image data.

First, a hard copy 412 of a document is scanned using a scanner to obtain a scanned image 414 of hard copy 412. Hard copy 412 includes printed textual content with some noise, such as, handwritten characters, a smudge caused by a spill out, or faded print of the textual content. Then, scanned image 414 is inputted to pre-processing module 402, which processes scanned image 414 in order to obtain a readable image. To this end, pre-processing module 402 further includes a tilting module 416, a corner adjustment module 418, a brightness adjustment module 420, an inverting module 422, and a gray scale adjustment module 424.

Tilting module 416 tilts scanned image 414 in steps of a predefined angle of rotation until the text is readable. Corner adjustment module 418 adjusts the corners, if the corners of scanned image 414 are not aligned. Moreover, to produce a more readable image data, brightness adjustment module 420 adjusts the brightness of scanned image 414 based on an optimum brightness threshold; inverting module 422 inverts scanned image 414 from a colored image to a grayscale image; and gray scale adjustment module 424 adjusts the gray scale of scanned image 414 when its background is dark.

Thereafter, a plurality of copies of the readable image are provided to filter module 404. Filter module 404 then filters the plurality of copies using a plurality noise filters to obtain a corresponding plurality noise removed images. When required, additional noise filters may be included in filter module 404. Alternatively, one or more noise filters in filter module 404 may be removed. The plurality of noise removed images are then sent to image data recognition module 406, which performs image data recognition on each of the plurality of noise removed images to obtain a text copy associated with each of the plurality of noise removed images. In an embodiment, the image data recognition operation further comprises the operations of optical character recognition, face recognition, and object recognition in the image data.

Thereafter, ranking module 408 ranks each word in the text copy associated with each of the plurality of noise removed images based on a predefined set of parameters. The predefined set of parameters for a word include the string distance of the word across text copies associated with each of the plurality of noise removed images and a word index associated with the word. Ranking module 408 may use the Levenshtein distance algorithm to calculate the string distance of the word across the text copies. Selecting module 410 then selects the highest ranked words within the text copy associated with each of the plurality of noise removed images to obtain an output text 426 for the image data. In an embodiment, the above described functionalities of modules within text extraction module 400 are performed by the one or more processors within system 100.

FIGS. 5A and 5B illustrate a method of extraction of text from an image data, in accordance with an exemplary embodiment. In this exemplary embodiment, an image data 500 is provided which includes two printed lines:

"Here comes the Optimus Prime.

While I function, Earth is under my protection".

The first line "Here comes the Optimus Prime" includes five words. The second line "While I function, Earth is under my protection" includes eight words. Image data 500 also includes some hand drawn characters 502, which act as noise during the text extraction process. First, image data 500 is pre-processed to obtain a readable image data and five copies of the readable image data are filtered using five noise filters to obtain corresponding five noise removed images. Thereafter, OCR is performed on each of the five noise removed images to obtain a text copy associated with each of the five noise removed images. A data table 504 corresponds to the first line "Here comes the Optimus Prime" and includes five rows, i.e., a row 506, a row 508, a row 510, a row 512, and a row 514. Each of these five rows corresponds to a noise removed image, referred to as an "Image Index" in the respective row header. For example, row 506 has the row header: "Image Index 1," and refers to the first noise removed image. Similarly, row 508 refers to the second noise removed image, row 510 refers to the third noise removed image, row 512 refers to the fourth noise removed image, and row 514 refers to the fifth noise removed image. Further, each row includes a text copy associated with the particular noise removed image as indicated by the corresponding "Image Index".

Accordingly, row 506 includes the first text copy associated with the first noise removed image, which is represented as: "Tlere Oomes Thy Optinus Prime". Each cell in row 506 includes a word in the first text copy. In other words, the first cell in row 506 (after the row header) includes the word "Tlere", the second cell includes the word "Oomes," the third cell includes the word "Thy," the fourth cell includes the word "Optinus," and the fifth cell includes the word "Prime". Similarly, the remaining four text copies are included in rows 508-514.

Further, data table 504 includes five columns, i.e., a column 518, a column 520, a column 522, a column 524, and a column 526. Each column corresponds to a particular word, referred to as a "Word Index" in the column header. The "Word Index" is representative of a position of the word in a line. For example, the first line "Here comes the Optimus Prime" includes five words; therefore, five word indexes will be used for the first line, namely, "Word Index 1", "Word Index 2", "Word Index 3", "Word Index 4" and "Word Index 5". Column 518 has the column header: "Word Index 1," and refers to the first word in the first line. Similarly, column 520 refers to the second word in the first line, column 522 refers to the third word in the first line, column 524 refers to the fourth word in the first line, and column 526 refers to the fifth word in the first line. Further, each column includes a word (based on the word index) across the five text copies. Accordingly, column 518 includes the first word across the five text copies: "Tlere" (row 506), "Ilere" (row 508), "Here" (row 510), "Tieie" (row 512) and "Here" (row 514).

In a similar fashion, data table 528 corresponds to the second line, i.e., "While I function, Earth is under my protection" and includes five rows, i.e. a row 530, a row 532, a row 534, a row 536 and a row 538. Further, data table 528 includes eight columns, i.e., a column 540, a column 542, a column 544, a column 546, a column 548, a column 550, a column 552, and a column 554. Each of five rows 530-538 include a text copy associated with a noise removed image, and each column corresponds to a "Word index". This has been described in detail in conjunction with the data table 504 above. Data table 504 and data table 528 are multi-dimensional text format [Image index, Word index, Word] representation of the five text copies obtained after OCR is performed.

Next, each word in the five text copies is ranked based on a predefined set of parameters. The predefined set of parameters for a word include the string distance of the word across text copies associated with each of the five noise removed images and a word index associated with the word. The string distance is calculated using the Levenshtein distance algorithm.

Referring back to data table 504, the Levenshtein distance algorithm is applied separately for each word across the five text copies. With reference specifically to first word of the first line, i.e., "Here," column 518 includes the first word across the five text copies, i.e., "Tlere" (row 506), "Ilere" (row 508), "Here" (row 510), "Tieie" (row 512) and "Here" (row 514). The result obtained on application of the Levenshtein distance algorithm to the first word in column 518 across the five text copies is depicted in a data table 556. Data table 556 includes five rows, i.e. a row 558, a row 560, a row 562, a row 564, and a row 566. Further, data table 556 includes five columns, i.e. a column 568, a column 570, a column 572, a column 574, and a column 576. As shown in data table 556, both the row header and the column header include the first word from the five text copies. Further, data table 556 includes an additional column 578 titled "Count of Zeros".

For each word in data table 556, the Levenshtein distance is determined. The Levenshtein distance between two words is defined as the minimum number of single-character edits (i.e. insertions, deletions or substitutions) required to change one word into the other. For example, for a cell (558, 568), the Levenshtein distance is zero, as the words in the header of column 568 and the header of row 558 are exactly same, i.e., "Tlere". However, for a cell (558, 570), the Levenshtein distance is one, as one character "T" needs to be changed to "I", to convert the word "Tlere" (as given in the header of row 558) to "Ilere" (as given in the header of column 570). Similarly, the Levenshtein distance is determined for the remaining cells (formed by the rows 558-566 and the columns 568-576). Thereafter, the number of zeros is counted for each row and the number obtained is included in column 578. Each of row 558, row 560, and row 564 has one zero and each of row 562 and row 566 has two zeros. Thus, rows 562 and 566 have the highest number of zeros, and each of rows 562 and 566 correspond to the same word, i.e., "Here". Therefore, the word "Here" is highest ranked word. Accordingly, the word "Here" is selected as the first word for the output text. A similar process is repeated for remaining words. Finally, the output text reads "Here comes the Optimus Prime". Similarly, for the second line, the output text reads "While I function, Earth is under my protection".

Figure 6:
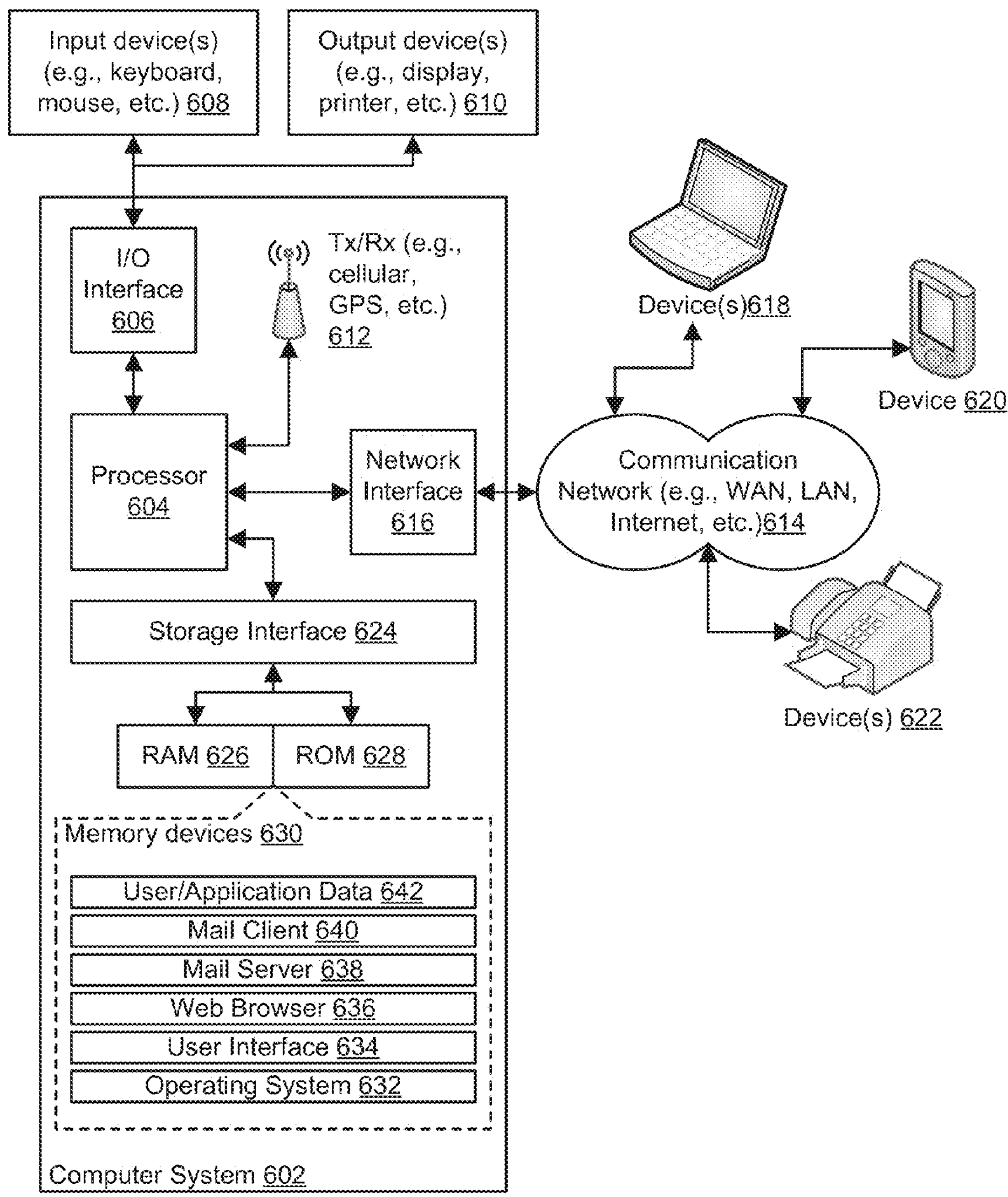
FIG. 6 is a block diagram of an exemplary computer system for implementing various embodiments.

FIG. 6 is a block diagram of an exemplary computer system for implementing various embodiments. Computer system 602 may comprise a central processing unit ("CPU" or "processor") 604. Processor 604 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. Processor 604 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 604 may be disposed in communication with one or more input/output (I/O) devices via an I/O interface 606. I/O interface 606 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using I/O interface 606, computer system 602 may communicate with one or more I/O devices. For example, an input device 608 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. An output device 610 may be a printer, fax machine, video display (e.g., cathode ray tube (CRT), liquid crystal display (LCD), light-emitting diode (LED), plasma, or the like), audio speaker, etc. In some embodiments, a transceiver 612 may be disposed in connection with processor 604. Transceiver 612 may facilitate various types of wireless transmission or reception. For example, transceiver 612 may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, processor 604 may be disposed in communication with a communication network 614 via a network interface 616. Network interface 616 may communicate with communication network 614. Network interface 616 may employ connection protocols including, without limitation, direct connect, Ethernet (e.g., twisted pair 50/500/5000 Base T), transmission control protocol/internet protocol (TCP/IP), token ring, IEEE 802.11a/b/g/n/x, etc. Communication network 614 may include, without limitation, a direct interconnection, local area network (LAN), wide area network (WAN), wireless network (e.g., using Wireless Application Protocol), the Internet, etc. Using network interface 616 and communication network 614, computer system 602 may communicate with devices 618, 620, and 622. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, computer system 602 may itself embody one or more of these devices.

In some embodiments, processor 604 may be disposed in communication with one or more memory devices (e.g., RAM 626, ROM 628, etc.) via a storage interface 624. Storage interface 624 may connect to memory devices 630 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory devices 630 may store a collection of program or database components, including, without limitation, an operating system 632, a user interface application 634, a web browser 636, a mail server 638, a mail client 640, a user/application data 642 (e.g., any data variables or data records discussed in this disclosure), etc. Operating system 632 may facilitate resource management and operation of the computer system 602. Examples of operating system 632 include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 634 may facilitate display, execution, interaction, manipulation, or operation of program components through textual or graphical facilities. For example, user interfaces may provide computer interaction interface elements on a display system operatively connected to computer system 602, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, computer system 602 may implement web browser 636 stored program component. Web browser 636 may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, computer system 602 may implement mail server 638 stored program component. Mail server 638 may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, computer system 602 may implement mail client 640 stored program component. Mail client 640 may be a mail viewing application, such as Apple Mail, Microsoft Entourage, Microsoft Outlook, Mozilla Thunderbird, etc.

In some embodiments, computer system 602 may store user/application data 642, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiments disclose methods and systems for extracting text from an image data. The image data is pre-processed to obtain a readable image data. Then, a plurality of copies of the readable image data are filtered to obtain noise removed images. Next, image data recognition is performed on the noise removed images to obtain corresponding text copies. Each word in the text copy is ranked and the highest ranked words are selected to obtain output text for the image data. The disclosed method increases the chances of extracting high quality output text, without requiring any special training. The system is portable, easy to use, and flexible. Further, the system is not dependent on any specific hardware. Moreover, the disclosed methods and systems are not just limited to extracting text, they can be used for face and object recognition as well.

The specification has described methods and systems for text extraction from images. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for extracting text from an image data, the method comprising:
- pre-processing, via a processor, the image data to obtain a readable image data;
- filtering, via the processor, a plurality of copies of the readable image data using a plurality of noise filters to obtain a corresponding plurality of noise removed images;
- performing, via the processor, image data recognition on each of the plurality of noise removed images to obtain a text copy associated with each of the plurality of noise removed images;
- ranking, via the processor, each word in the text copy associated with each of the plurality of noise removed images based on a predefined set of parameters; and
- selecting, via the processor, highest ranked words within the text copy associated with each of the plurality of noise removed images to obtain output text for the image data.

2. The method of claim 1, wherein pre-processing comprises tilting the image data at a predefined angle of rotation until the text is readable.

3. The method of claim 1, wherein pre-processing comprises adjusting corners of the image data when the corners are not aligned, adjusting the corners comprising subjecting the image data to a plurality of movements selected from a group comprising left to right movement, right to left movement, top to bottom movement, and bottom to top movement.

4. The method of claim 1, wherein pre-processing comprises inverting the image data from a colored image to a grayscale image.

5. The method of claim 1, wherein pre-processing comprises adjusting grayscale of the image data when background in the image data is dark.

6. The method of claim 1, wherein pre-processing comprises adjusting brightness of the image data based on an optimum brightness threshold of the image data.

7. The method of claim 1, wherein pre-processing comprises adjusting Dots per Inch (DPI) of the image data.

8. The method of claim 1 further comprising creating, via the processor, the plurality of copies of the readable image data obtained in response to pre-processing.

9. The method of claim 1 further comprising storing, in a memory, each of the plurality of noise removed images obtained in response to filtering.

10. The method of claim 1, wherein the image data recognition comprises optical character recognition, face recognition, and object recognition in the image data.

11. The method of claim 10, wherein performing the optical character recognition comprises generating multi-dimensional text comprising an image data index, a word index, and a word.

12. The method of claim 1, wherein the predefined set of parameters for a word comprise string distance of the word across text copies associated with each of the plurality of noise removed images and a word index associated with the word, the word index being representative of a position of the word across the text copies.

13. The method of claim 12, wherein ranking comprises using a string distance algorithm to weigh each word based on associated word index, highest fit words being assigned highest numerical rank value.

14. A system for extracting text from an image data, the system comprising:
- at least one processors; and
- a computer-readable medium storing instructions that, when executed by the at least one processor, cause the at least one processor to perform operations comprising:
  - pre-processing the image data to obtain a readable image data;
  - filtering a plurality of copies of the readable image data using a plurality of noise filters to obtain a corresponding plurality of noise removed images;
  - performing image data recognition on each noise removed image to obtain a text copy associated with each noise removed image;
  - ranking each word in the text copy associated with each noise removed image based on a predefined set of parameters; and
  - selecting highest ranked words within the text copy associated with each noise removed image to obtain output text for the image data.

15. The system of claim 14, wherein the pre-processing operation further comprises operation of at least one of tilting, adjusting corners, adjusting Dots per Inch (DPI), adjusting brightness, inverting image data, and adjusting gray scale.

16. The system of claim 14, wherein the operations further comprise creating the plurality of copies of the readable image data obtained in response to pre-processing.

17. The system of claim 14, wherein the operations further comprise storing, in a memory, the plurality of noise removed images obtained in response to filtering.

18. The system of claim 14, wherein performing image data recognition operation further comprises operations of optical character recognition, face recognition, and object recognition in the image data.

19. The system of claim 18, wherein performing optical character recognition operation comprises operation of generating multi-dimensional text comprising an image index, a word index, and a word.

20. The system of claim 14, wherein the predefined set of parameters for a word comprise string distance of the word across text copies associated with each of the plurality of noise removed images and a word index associated with the word, the word index being representative of a position of the word across the text copies.

21. The system of claim 20, wherein the ranking operation further comprises operation of using a string distance algorithm to weigh each word based on associated word index, highest fit words being assigned highest numerical rank value.

22. A non-transitory computer-readable storage medium for extracting text from an image data when executed by a computing device, cause the computing device to:

pre-process the image data to obtain a readable image data;

filter a plurality of copies of the readable image data using a plurality of noise filters to obtain a corresponding plurality of noise removed images;

perform image data recognition on each noise removed image to obtain a text copy associated with each noise removed image;

rank each word in the text copy associated with each noise removed image based on a predefined set of parameters; and select highest ranked words within the text copy associated with each noise removed image to obtain output text for the image data.

* * * * *